United States Patent
Kokubo

(10) Patent No.: US 8,256,849 B2
(45) Date of Patent: Sep. 4, 2012

(54) BRAKING CONTROL DEVICE

(75) Inventor: Koichi Kokubo, Nagoya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 421 days.

(21) Appl. No.: 12/556,192

(22) Filed: Sep. 9, 2009

(65) Prior Publication Data
US 2010/0066164 A1 Mar. 18, 2010

(30) Foreign Application Priority Data
Sep. 12, 2008 (JP) ................................ 2008-234620

(51) Int. Cl.
*B60T 8/38* (2006.01)

(52) U.S. Cl. ................... 303/119.1; 303/113.1; 303/150

(58) Field of Classification Search .............. 303/20, 303/113.1, 114.1, 114.3, 116.1, 119.1, 150, 303/153, 155, 156, 168; 251/129.05, 129.08
See application file for complete search history.

(56) References Cited

U.S. PATENT DOCUMENTS

| | | | | |
|---|---|---|---|---|
| 6,098,644 | A * | 8/2000 | Ichinose | 251/129.05 |
| 7,237,516 | B2 * | 7/2007 | Kunz | 251/129.05 |
| 2002/0053652 | A1 * | 5/2002 | Freisinger et al. | 251/129.08 |

FOREIGN PATENT DOCUMENTS

JP 2004-203110 A 7/2004
* cited by examiner

*Primary Examiner* — Thomas J Williams
(74) *Attorney, Agent, or Firm* — Buchanan Ingersoll & Rooney PC

(57) ABSTRACT

A braking control device which adjusts fluid pressure according to the degree of opening of a proportional electromagnetic valve driven at a set drive frequency, and controls a braking force on the basis of the adjusted fluid pressure, comprises a required pressure adjustment precision index setting mechanism for setting a required pressure adjustment precision index on the basis of the precision of pressure adjustment required when the fluid pressure is adjusted according to a required braking force, required operating noise reduction index setting mechanism for setting a required operating noise reduction index on the basis of a requirement to reduce operating noise caused by the drive frequency for driving the proportional electromagnetic valve, and drive frequency setting mechanism for setting the drive frequency of the proportional electromagnetic valve on the basis of the set required pressure adjustment precision index and required operating noise reduction index.

17 Claims, 5 Drawing Sheets

BRAKING CONTROL DEVICE

BACKGROUND OF THE INVENTION

1. Field of the Invention

The present invention relates to a braking control device for adjusting a fluid pressure according to the degree of opening of a proportional electromagnetic valve driven at a set drive frequency, and controlling a braking force on the basis of the adjusted fluid pressure.

2. Description of the Related Art

Conventional control devices are known in which an excitation current is applied to a linear solenoid to control the driving of a proportional electromagnetic valve, and the object being controlled is controlled by the proportional electromagnetic valve. In one application of this technique, a proportional electromagnetic valve is provided in a braking control device of a vehicle. In such a braking control device, a predetermined current as a control signal is fed from a control device to the linear solenoid of the proportional electromagnetic valve, whereby the proportional electromagnetic valve actuates and opens and closes an oil channel, and the flow rate or hydraulic pressure of the oil is adjusted. In this type of braking control device, noise is sometimes generated by wide fluctuations in hydraulic pressure between the upstream side (master cylinder side) and downstream side (wheel cylinder side) of the proportional electromagnetic valve. Vehicle braking force maintaining devices (hereinafter referred to as braking force maintaining devices) have therefore been developed that are capable of suppressing the occurrence of such noise (Patent Document 1, for example).

In the braking force maintaining device described in Patent Document 1, the control frequency of duty control for controlling the opening and closing of the electromagnetic valve is set to a low value (20 Hz) when the brake fluid pressure of the channel downstream from the electromagnetic valve is higher than a predetermined pressure (3 MPa), i.e., when the braking force that had been maintained in order to prevent movement of the vehicle is still large. When the brake fluid pressure of the channel downstream from the electromagnetic valve is at or below the predetermined pressure (3 MPa), i.e., when a certain amount of braking force remains, the control frequency of duty control for controlling the opening and closing of the electromagnetic valve is set somewhat high (60 Hz). When the brake fluid pressure of the channel downstream from the electromagnetic valve has been adequately reduced (to 0.3 MPa or lower), the control frequency of duty control for controlling the opening and closing of the electromagnetic valve is set to an extremely high value (1 kHz).

PRIOR ART DOCUMENTS

Patent Documents

[Patent Document 1] JP (Kokai) 2004-203110 (paragraph No. 0039 and others)

SUMMARY OF THE INVENTION

In the braking force maintaining device described in Patent Document 1, when the vehicle starts to move from brake holding control, i.e., when the brake fluid pressure is released, the frequency of control of the electromagnetic valve decreases with increased braking force, as described above. It is therefore possible to suppress the occurrence of noise generated by wide fluctuation of the fluid pressure between the upstream side (master cylinder side) and downstream side (wheel cylinder side) of the proportional electromagnetic valve. However, the frequency when the braking force maintaining device described in Patent Document 1 drives the proportional electromagnetic valve by duty control is 20 to 1 kHz, and this frequency range is within the range of frequencies audible to humans (20 to 20 kHz). The noise is therefore bothersome to vehicle occupants.

The present invention was developed in view of the problems described above, and an object of the present invention is to provide a braking control device whereby operating noise caused by the drive frequency of the proportional electromagnetic valve can be reduced without reducing the performance of fluid pressure control.

In order to adjust a fluid pressure according to the degree of opening of a proportional electromagnetic valve driven at a set drive frequency, and to control a braking force on the basis of the adjusted fluid pressure, the braking control device according to the present invention for achieving the above-mentioned objects comprises required pressure adjustment precision index setting means for setting a required pressure adjustment precision index on the basis of the precision of pressure adjustment required when the fluid pressure is adjusted according to a required braking force; required operating noise reduction index setting means for setting a required operating noise reduction index on the basis of a requirement to reduce operating noise caused by the drive frequency for driving the proportional electromagnetic valve; and drive frequency setting means for setting the drive frequency of the proportional electromagnetic valve on the basis of the set required pressure adjustment precision index and required operating noise reduction index.

Adopting such a characteristic configuration makes it possible to set the drive frequency of the proportional electromagnetic valve according to the degree of priority when a degree of precision of fluid pressure that is in accordance with the braking force is required, and when reduction of the operating noise is required. Consequently, it is possible to reduce operating noise that occurs due to the drive frequency of the proportional electromagnetic valve, without reducing the performance of fluid pressure control.

The drive frequency setting means preferably sets the drive frequency of the proportional electromagnetic valve to a value that increases with decreased set required pressure adjustment precision index or increased set required operating noise reduction index.

Through such a configuration, when a degree of precision of fluid pressure that is in accordance with the braking force is not required, or when reduction of the operating noise is required, the operating noise that occurs due to the drive frequency of the proportional electromagnetic valve can be reduced by setting the drive frequency of the proportional electromagnetic valve to a high value. Consequently, operating noise that is bothersome to vehicle occupants can be made inaudible.

The required operating noise reduction index setting means preferably sets the required operating noise reduction index to a value that increases with decreased vehicle speed.

Through such a configuration, even when the speed of the vehicle is low and there is minimal travel noise, the drive frequency of the proportional electromagnetic valve is set to a high value, and operating noise that occurs due to the drive frequency of the proportional electromagnetic valve can therefore be made inaudible to the vehicle occupants.

Frictional coefficient acquiring means is preferably provided for acquiring the frictional coefficient of a road surface on which the vehicle is positioned, wherein the required operating noise reduction index setting means sets the required operating noise reduction index to a value that increases with decreased acquired frictional coefficient of the road surface.

Through such a configuration, when the frictional coefficient of the road surface is small and the vehicle occupant drives more cautiously, the drive frequency of the proportional electromagnetic valve is set to a high value, and operating noise that occurs due to the drive frequency of the proportional electromagnetic valve can therefore be made inaudible to the vehicle occupants.

Control mode determining means is preferably provided for determining a control mode of the braking force according to the state of the vehicle, wherein the required pressure adjustment precision index setting means and the required operating noise reduction index setting means set the required pressure adjustment precision index and required operating noise reduction index on the basis of the determined control mode of the braking force.

Through such a configuration, a fluid pressure that is in accordance with the braking force can be precisely set when precise brake control is needed, such as in a vehicle control mode used during an emergency, for example. Consequently, it is possible for the determined control mode to be implemented appropriately. In such cases as when silence is needed more than precise brake control, such as when the vehicle occupants are riding in relaxed fashion, the drive frequency of the proportional electromagnetic valve is set to a high value, and operating noise that occurs due to the drive frequency of the proportional electromagnetic valve can be made inaudible to the vehicle occupants.

In order to adjust a fluid pressure according to the degree of opening of a proportional electromagnetic valve driven at a set drive frequency, and to control a braking force on the basis of the adjusted fluid pressure, the braking control device according to the present invention for achieving the above-mentioned objects alternatively comprises control mode determining means for determining a control mode of the braking force according to the state of the vehicle, and drive frequency setting means for setting the drive frequency of the proportional electromagnetic valve on the basis of the control mode determined by the control mode determining means.

Through such a characteristic configuration, in a specific control mode used when, for example, the vehicle occupants are traveling in relaxed fashion, travel noise becomes significant when the vehicle speed is high, and the operating noise of the proportional electromagnetic valve is therefore hardly noticeable. Therefore, a fluid pressure that is in accordance with the braking force can be precisely set by setting the drive frequency of the proportional electromagnetic valve to a low value. Since travel noise is low when the vehicle speed is low, the drive frequency of the proportional electromagnetic valve can be set to a high value, and the operating noise of the proportional electromagnetic valve can be made inaudible to the vehicle occupants.

In order to adjust a fluid pressure according to the degree of opening of a proportional electromagnetic valve driven at a set drive frequency, and to control a braking force on the basis of the adjusted fluid pressure, the braking control device according to the present invention for achieving the above-mentioned objects alternatively comprises vehicle speed acquiring means for acquiring the speed of the vehicle, and drive frequency setting means for setting the drive frequency of the proportional electromagnetic valve to a value that increases with decreased acquired vehicle speed.

Through such a characteristic configuration, travel noise becomes significant when the vehicle speed is high, and the operating noise of the proportional electromagnetic valve is therefore hardly noticeable. Accordingly, a fluid pressure that is in accordance with the braking force can be precisely set by setting the drive frequency of the proportional electromagnetic valve to a low value. Since travel noise is low when the vehicle speed is low, the drive frequency of the proportional electromagnetic valve can be set to a high value, and the operating noise of the proportional electromagnetic valve can be made inaudible to the vehicle occupants.

In order to adjust a fluid pressure according to the degree of opening of a proportional electromagnetic valve driven at a set drive frequency, and to control a braking force on the basis of the adjusted fluid pressure, the braking control device according to the present invention for achieving the above-mentioned objects alternatively comprises frictional coefficient acquiring means for acquiring the frictional coefficient of a road surface on which the vehicle is positioned, and drive frequency setting means for setting the drive frequency of the proportional electromagnetic valve to a value that increases with decreased acquired frictional coefficient of the road surface.

Through such a characteristic configuration, when the frictional coefficient of the road surface is low, and the vehicle occupant drives more cautiously, the drive frequency of the proportional electromagnetic valve is set to a high value, and operating noise that occurs due to the drive frequency of the proportional electromagnetic valve can therefore be made inaudible to the vehicle occupants.

DESCRIPTION OF THE PREFERRED EMBODIMENTS

Figure 1:
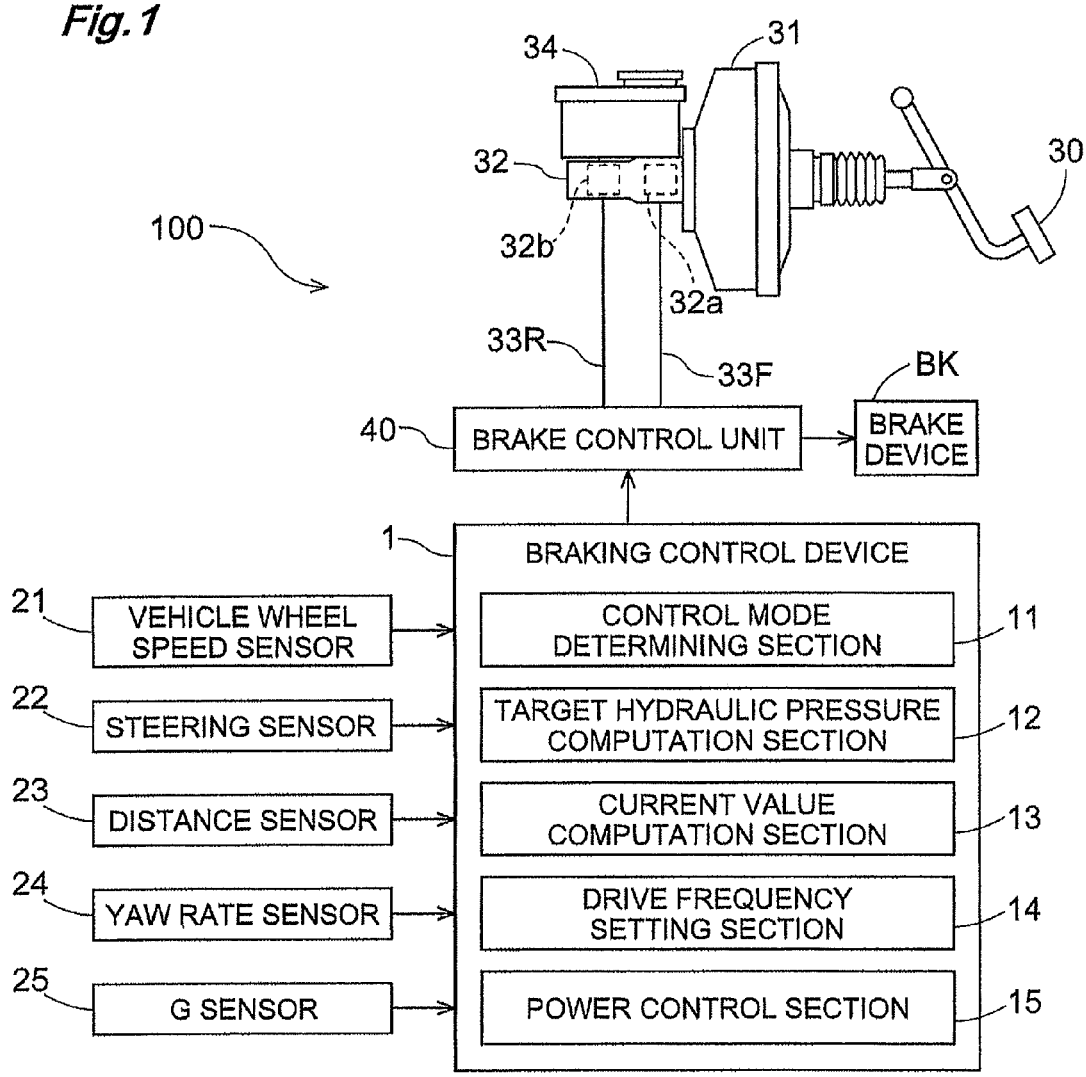
FIG. 1 is a view schematically showing the control blocks of a brake system to which the braking control device is provided.

Embodiments of the present invention will next be described based on the drawings. FIG. 1 is a view schematically showing the control blocks of a brake system 100 to which the braking control device 1 of the present invention is provided. In the present embodiment, the braking control device 1 is provided to a vehicle, and the braking control device 1 adjusts a fluid pressure in accordance with the degree of opening of a proportional electromagnetic valve 49 (see FIG. 5) driven at a set drive frequency, and controls braking force on the basis of the adjusted fluid pressure.

The brake system 100 has a control system for augmenting the force with which a brake pedal 30 is depressed (depressing force) through the use of a booster 31, transmitting the augmented force to a tandem-type master cylinder 32, and transmitting the pressure of brake fluid in the master cylinder 32 from a brake control unit 40 to a brake device BK.

The master cylinder 32 has a structure for simultaneously sending, in accordance with a brake depression operation, pressurized brake fluid from one pressurization chamber 32a via a fluid path 33F to the brake device BK provided to the front wheels, and sending pressurized brake fluid from another pressurization chamber 32b via a fluid path 33R to the brake device BK provided to the rear wheels. The pressure of the brake fluid from the fluid paths 33F, 33R is applied to the brake device BK via the brake control unit 40.

The booster 31 has the functions of augmenting the depressing force by the action of the vacuum pressure of an engine (not shown) on a diaphragm (not shown) inside the booster 31 and applying the augmented force to the master cylinder 32 when the brake pedal 30 is depressed. The master cylinder 32 is in a horizontal orientation, two pistons (not shown) are arranged concentrically in tandem inside the master cylinder 32, and pressure is applied to the brake fluid from the pressurization chamber 32a or 32b that corresponds to each piston. A reservoir tank 34 for replenishing the brake fluid in the master cylinder 32 is provided at the top of the master cylinder 32.

A vehicle wheel speed sensor 21 for detecting the state of the vehicle, a steering sensor 22, a distance sensor 23, a yaw rate sensor 24, and a G sensor 25 are also provided to the vehicle.

The vehicle wheel speed sensor 21 monitors the locking state of the vehicle wheels and detects the speed of the vehicle, and therefore corresponds to the vehicle speed acquiring means for acquiring the speed of the vehicle. A vehicle wheel speed sensor 21 having such a function is provided to the left-front, right-front, left-rear, and right-rear (hereinafter referred to as FL, FR, RL, and RR, respectively) wheels of the vehicle. The steering sensor 22 detects the rudder angle when rotated with respect to the center steering position. The distance sensor 23 measures the distance to a vehicle positioned directly in front. The distance sensor 23 has an ultrasound transmitter and receiver, and measures distance from the time that elapses between transmission of an ultrasound wave and detection of the reflected wave. This distance corresponds to the inter-vehicular distance between the vehicle and a vehicle traveling in front of the vehicle when the vehicle is moving. The use of ultrasound is, of course, not limiting, and microwaves or other electromagnetic waves may be used, or the distance may be measured optically using infrared lasers or the like. The yaw rate sensor 24 detects the vehicle speed (angular speed) when the vehicle is traveling in a curve, and the G sensor 25 detects the acceleration experienced by the vehicle. This detection of acceleration is possible not only for acceleration in the horizontal direction, but for acceleration in the vertical direction as well. The detection results acquired by the vehicle wheel speed sensor 21, steering sensor 22, distance sensor 23, yaw rate sensor 24, and G sensor 25 are transmitted as sensor outputs to the braking control device 1.

The braking control device 1 is composed of functional sections that include a control mode determining section 11, a target hydraulic pressure computation section 12, a current value computation section 13, a drive frequency setting section 14, and a power control section 15.

The control mode determining section 11 functions as a control mode determining means for determining a control mode of the braking force according to the state of the vehicle. The state of the vehicle can be specified according to the sensor outputs described above. The term "control mode" refers to a type of brake control that is appropriate in order to maintain the safety of the vehicle when the vehicle is traveling. In the present embodiment, the control modes are ABS mode, TCS mode, ESC mode, ACC mode, PCS mode, and REG mode.

The ABS mode is a control mode for preventing the tires from locking and slipping during sudden braking or brake operation on a low-friction road. The TCS mode is a control mode for preventing the tires from skidding when the vehicle accelerates or begins to move. The ESC mode is a control mode for suppressing sideways sliding and automatically maintaining the travel direction of the vehicle when sideways slipping of the vehicle is sensed during travel on a slippery road or when the steering wheel is turned suddenly. The ACC mode is a control mode for automatically adjusting the distance between the vehicle and a vehicle in front. The PCS mode is a control mode for warning the vehicle occupant of impending danger using a sound or display, and increasing the hydraulic pressure of the brake so that the brake is applied merely by a small depression of the brake pedal 30 when the potential for collision is determined to be high on the basis of the position of, or distance to, an obstacle. In the PCS mode, when the brake hydraulic pressure is increased, and a collision is unavoidable notwithstanding the warning, the mode automatically forces the brake to be applied. When the vehicle is a hybrid vehicle, the REG mode is a control mode for cooperatively controlling a normal hydraulic brake and a regenerative brake for recovering a battery by causing a rotary electric motor, which is the drive source during deceleration or braking, to operate as an electrical generator and converting the kinetic energy of the vehicle into electrical energy, and obtaining a braking force that is in accordance with the depressing force of the brake pedal 30.

The control mode determining section 11 determines the optimum control mode from among the control modes described above according to the state of the vehicle, on the basis of the sensor outputs transmitted from the sensors described above. Consequently, it is possible to maintain the safety of the vehicle, provide a pleasant riding experience for the occupants, and ensure the safety of the occupants.

The target hydraulic pressure computation section 12 computes the target hydraulic pressure that is necessary for the brake device BK in order to decelerate or stop the vehicle. Specifically, when the vehicle is forced out of a curve by centrifugal force while traveling in a curve, the actual yaw rate is detected as being smaller than the raw rate that is determined from the speed and the degree to which the steering is turned. In such a case, control is performed so that the output of the engine is reduced, braking is applied, and the disparity with the proper course is reduced. In such cases as when the vehicle goes into a spin, a yaw rate is detected that is larger than the yaw rate determined from speed and centrifugal force. In such a case, the spin can be suppressed by applying a strong braking force to the outside front wheel. Such maintenance of stability is utilized not only during travel in a curve, such as described above, but also during sudden steering to avoid an obstacle, or when suppressing sideways sliding at such times as when the vehicle enters a curve on a slippery road surface.

Although this is described in greater detail hereinbelow, the brake control unit 40 is also provided with a proportional electromagnetic valve 49 so as to add to the pressure of the brake fluid sent from the master cylinder 32, adjust the pressure of the brake fluid sent by a pump P, and apply the brake fluid to brake devices BK provided to the vehicle wheels. The proportional electromagnetic valve 49 is a normally open-type valve that is controlled from an open-valve state to a closed-valve state in order to open or block the flow path through which the brake fluid flows, and the opening and closing of the valve body (not shown) of the proportional electromagnetic valve 49 is controlled by applying an excitation current to a linear solenoid 49a (see FIG. 4) provided to the proportional electromagnetic valve 49. The excitation current applied to the linear solenoid 49a is determined by the current value computation section 13 according to the control mode of braking control as determined by the control mode determining section 11.

The proportional electromagnetic valve 49 is not merely fully open or fully closed, but the degree of opening thereof can be finely adjusted. Consequently, the excitation current computed by the current value computation section 13 and applied to the linear solenoid 49a is precisely computed according to the degree of opening. This excitation current is controlled by DUTY control. Specifically, the excitation current is determined by ON-DUTY and OFF-DUTY states. For example, the excitation current is 10 A when ON-DUTY is 100%, and the excitation current is 3 A when ON-DUTY is controlled at 30%. When ON-DUTY is controlled at 45%, the excitation current is 4.5 A. The desired excitation current can thus be applied by controlling the ON-DUTY. This ON-DUTY control is performed by the power control section 15 described hereinafter.

Figure 2:
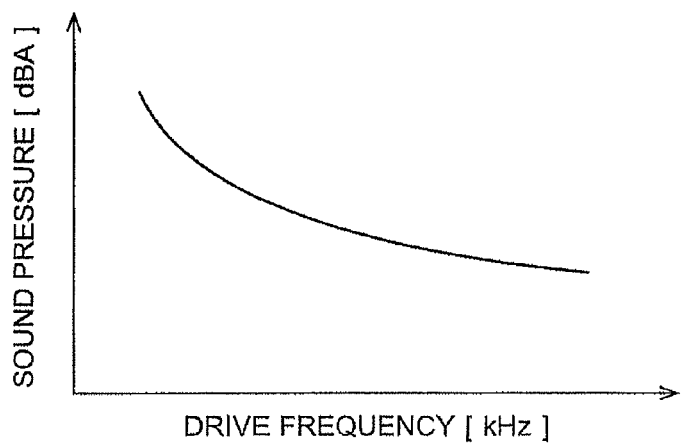
FIG. 2 is a view showing the relationship between sound pressure and the drive frequency of the proportional electromagnetic valve.

The drive frequency setting section 14 sets the frequency of the DUTY waveform relating to the DUTY control described above. This frequency is referred to as the drive frequency because a FET is driven by inputting this frequency to the gate terminal of the FET, which is switched in accordance with the DUTY waveform. The drive frequency used is usually 1 k to 10 kHz. The audible frequency range is considered to be 20 to 20 kHz. Consequently, the drive frequency for driving the abovementioned FET is sometimes audible and unpleasant to the vehicle occupants. FIG. 2 shows the relationship between such a drive frequency and the sound pressure of an unpleasant sound. As shown in FIG. 2, the sound pressure increases with lower drive frequency and decreases with higher drive frequency. A high drive frequency is thus preferred in order to reduce the sound pressure (reduce unpleasant sound). FIG. 2 shows a waveform in which the characteristic actually obtained has been filtered to remove noise.

Figure 3:
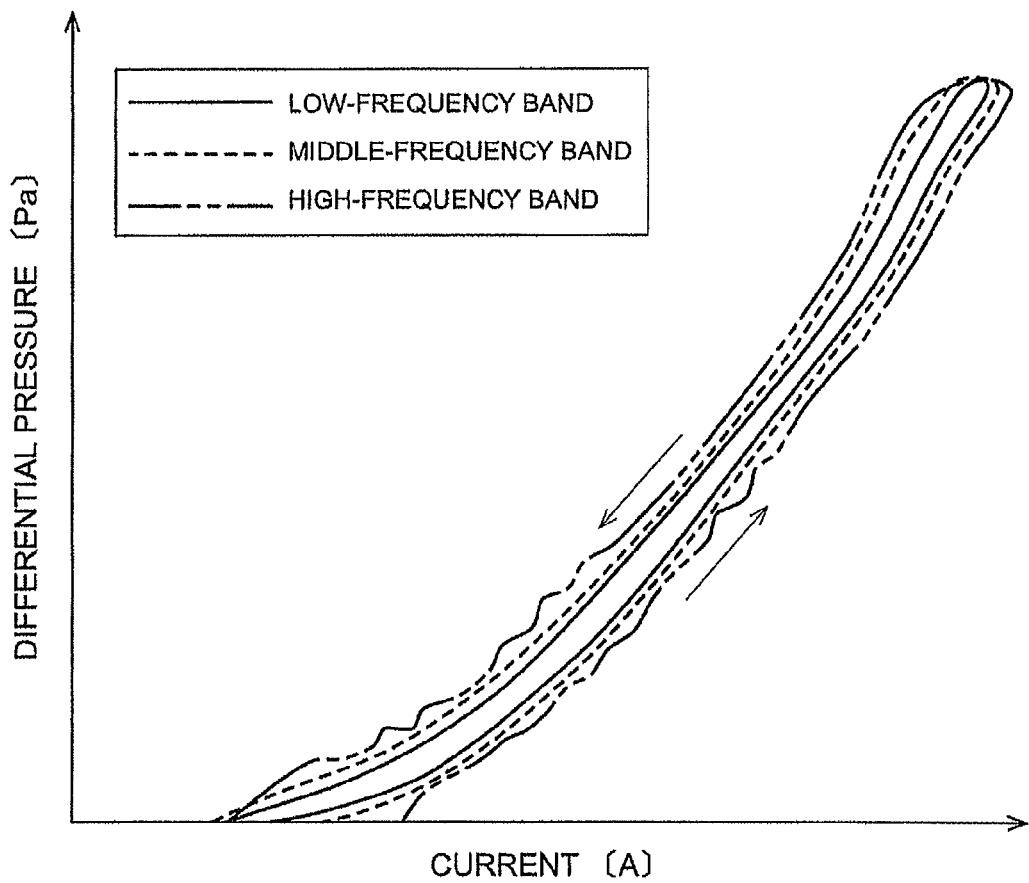
FIG. 3 is a view showing an example of the differential pressure characteristic of the proportional electromagnetic valve.

FIG. 3 is a view showing an example of the differential pressure characteristic of the proportional electromagnetic valve 49. FIG. 3 shows the relationship between differential pressure and three patterns of excitation currents for a low-frequency band (e.g., less than 3 kHz) in which the drive frequency is relatively low, a middle-frequency band (e.g., 3 kHz or higher and less than 7 kHz) in which the drive frequency is medium, and a high-frequency band (e.g., 7 kHz or higher) in which the drive frequency is high. The low-frequency band is indicated by a solid line, the middle-frequency band is indicated by a dashed line, and the high-frequency band is indicated by a chain double-dashed line. The differential pressure characteristic of the proportional electromagnetic valve 49 has hysteresis with respect to all the frequency bands, as shown in FIG. 3. Specifically, the differential pressure for the characteristic when the excitation current is increased differs from the differential pressure for the characteristic when the excitation current is reduced. Such hysteresis tends to increase as the drive frequency is increased (i.e., the width of the hysteresis tends to increase). Furthermore, when the drive frequency is high, the dither effect (effect whereby apparent friction decreases due to a minute high-frequency vibration being imparted in an area of solid friction) decreases, and the valve body therefore moves less readily. The characteristic is therefore stepped rather than smooth, as in the case of a low drive frequency. Given this hysteresis or the stepped characteristic, it is not easy to appropriately control the proportional electromagnetic valve 49 so that the hydraulic pressure of the brake device BK conforms to the target hydraulic pressure. A low drive frequency is therefore preferred in the differential pressure characteristic. There is thus a trade-off between reduction of sound pressure and controllability of the proportional electromagnetic valve 49 as relates to the drive frequency.

Returning to FIG. 1, the drive frequency setting section 14 therefore sets the drive frequency with consideration for reduction of sound pressure and controllability of the proportional electromagnetic valve 49. Specifically, in conditions in which precision of pressure adjustment is required, brake performance is emphasized over operating noise, and the drive frequency is therefore set low. In conditions in which there is little requirement for precision of pressure adjustment, and operating noise may be noticeable to the vehicle occupants, the drive frequency is set to a high value (as described in detail hereinafter).

Figure 4:
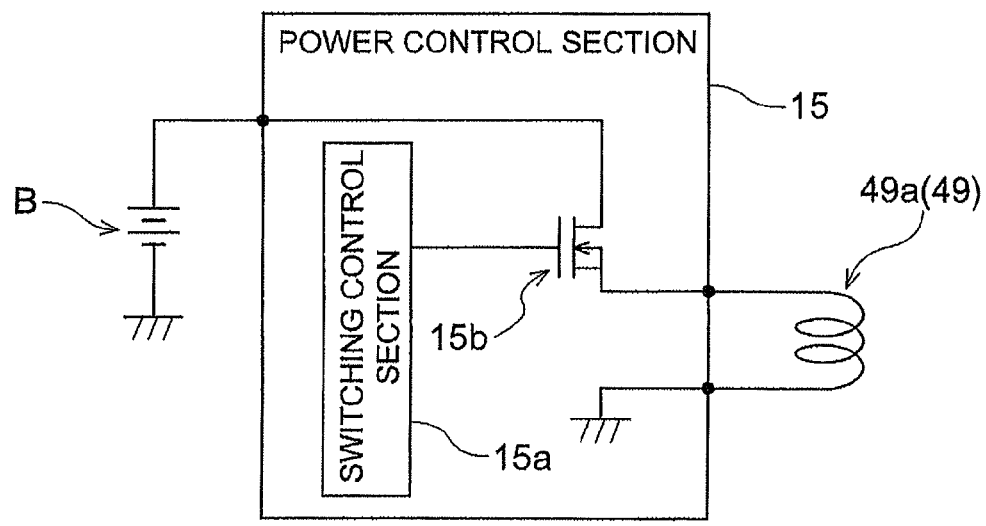
FIG. 4 is a view showing the overall structure of the power control section.

The power control section 15 applies an excitation current to the linear solenoid 49a on the basis of the current value computed by the current value computation section 13, and the drive frequency set by the drive frequency setting section 14. FIG. 4 is a view showing the overall structure of the power control section 15. The power control section 15 is provided with a switching control section 15a and a FET 15b. The switching control section 15a performs DUTY control so that the current value computed by the current value computation section 13 is achieved at the drive frequency set by the drive frequency setting section 14. The DUTY waveform outputted from this switching control section 15a is inputted to the gate terminal of the FET 15b.

A power supply B for feeding the excitation current to the linear solenoid 49a is connected to the drain terminal of the FET 15b. This power supply B may be a battery provided to the vehicle. One of the terminals of the linear solenoid 49a is connected to the source terminal of the FET 15b. The other terminal of the linear solenoid 49a is grounded. The FET 15b is turned on and a current flows from the battery B to the linear solenoid 49a when the DUTY waveform outputted from the switching control section 15a is in the "High" state. The FET 15b is turned off and a current no longer flows to the linear solenoid 49a when the DUTY waveform is in the "Low" state. The power control section 15 applies the excitation current to the linear solenoid 49a in this manner.

Figure 5:
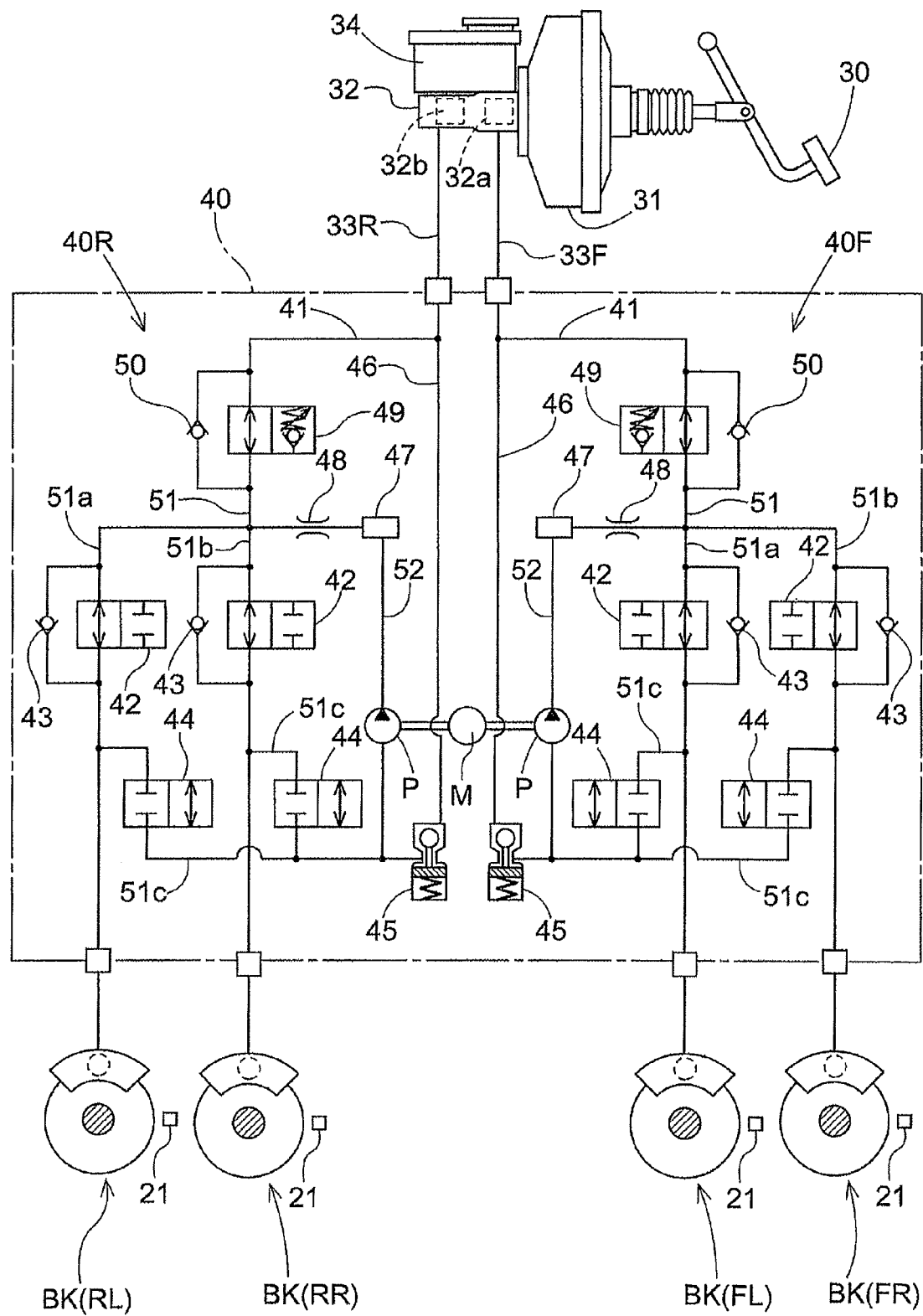
FIG. 5 is a view showing the internal structure of the brake control unit.

FIG. 5 is a view showing the internal structure of the brake control unit 40. The brake control unit 40 has a fluid pressure control section 40F for controlling the pressure of the brake fluid fed via the fluid path 33F and applying the pressure to the left front FL brake device BK and the right front FR brake device BK, and further has a fluid pressure control section 40R for controlling the pressure of the brake fluid fed via the fluid path 33R and applying the pressure to the left rear RL brake device BK and the right rear RR brake device BK.

The fluid pressure control section 40F that corresponds to the left front FL brake device BK and the right front FR brake device BK, and the fluid pressure control section 40R that corresponds to the left rear RL brake device BK and the right rear RR brake device BK have substantially the same structure and operate in the same manner. The structure and operation of the fluid pressure control section 40F that corresponds to the left front FL brake device BK and right front FR brake device BK will therefore be described below.

The fluid pressure control section 40F is provided with the normally open-type proportional electromagnetic valve 49 for causing the fluid pressure from a primary fluid path 41 communicated with the fluid path 33F to act on the left front FL and right front FR brake device BK. Parallel to the proportional electromagnetic valve 49, a check valve 50 is provided for allowing the fluid pressure to escape toward the brake devices BK from the fluid path 33F when the fluid pressure of the fluid path 33F is greater than the fluid pressure on the side of the brake devices BK.

A fluid path 51 is provided on the side of the proportional electromagnetic valve 49 toward the brake devices BK. A first flow diversion path 51a and a second flow diversion path 51b are formed in the fluid path 51. Normally open-type inlet valves 42 are interposed in the first flow diversion path 51a and second flow diversion path 51b, and check valves 43 for allowing fluid pressure to escape toward the fluid path 51 from the brake devices BK are provided parallel to the inlet valves 42.

Branch fluid paths 51c that branch in positions further toward the brake devices BK than the inlet valves 42 are formed in the first flow diversion path 51a and second flow diversion path 51b, and normally closed-type outlet valves 44 are interposed in the branch fluid paths 51c.

The inlet valves 42 are composed of electromagnetically operated two-position switch valves that are open when energized, and closed when not energized. The outlet valves 44 are composed of electromagnetically operated two-position switch valves that are closed when not energized, and open when energized.

A reservoir 45 for temporarily storing brake fluid is provided in the portion where the branch fluid paths 51c from the two outlet valves 44 merge, and a return fluid path 46 is provided for returning the brake fluid from the reservoir 45 to the primary fluid path 41.

A supply fluid path 52 is also provided, in which are interposed a pump P driven by an electric motor M so as to draw in the brake fluid from the merging portion of the branch fluid paths 51c through which the brake fluid is sent from the two outlet valves 44 and to return the brake fluid to the primary fluid path 41; a damper chamber 47 for reducing the sound of the brake fluid discharged from the pump P; and an orifice 48 for limiting the flow rate of the brake fluid that flows to the fluid path 51.

As described above, the drive frequency setting section 14 sets the drive frequency of the FET 15b provided to the power control section 15 according to the control mode of braking control. Specifically, this drive frequency coincides with the drive frequency of the proportional electromagnetic valve 49. The drive frequency setting section 14 sets the drive frequency of the proportional electromagnetic valve 49 on the basis of a required pressure adjustment precision index that is set based on the precision of pressure adjustment required when the fluid pressure is adjusted according to the required braking force, and on the basis of a required operating noise reduction index that is set based on a requirement to reduce the operating noise caused by the drive frequency for driving the proportional electromagnetic valve 49. The required pressure adjustment precision index is an index indicating the degree of precision of the fluid pressure according to the required braking force, and the required pressure adjustment precision index is set to a high value in control modes in which precision is required in the fluid pressure. The required pressure adjustment precision index is set by a required pressure adjustment precision index setting section (not shown) that functions as the required pressure adjustment precision index setting means. The ABS mode, TCS mode, ACC mode, REG mode, and other modes correspond to control modes in which pressure adjustment precision is required.

The required operating noise reduction index is an index indicating the degree to which there is a need to reduce the operating noise caused by the drive frequency at which the proportional electromagnetic valve 49 is driven, and the required operating noise reduction index is set to a high value in control modes in which reduction of operating noise is required. The required operating noise reduction index is set by a required operating noise reduction index setting section (not shown) that functions as the required operating noise reduction index setting means. The ACC mode or REG mode corresponds to a control mode in which reduction of operating noise is required, and states of low-speed control or keeping the vehicle stopped also correspond to such a control mode.

Figure 6:
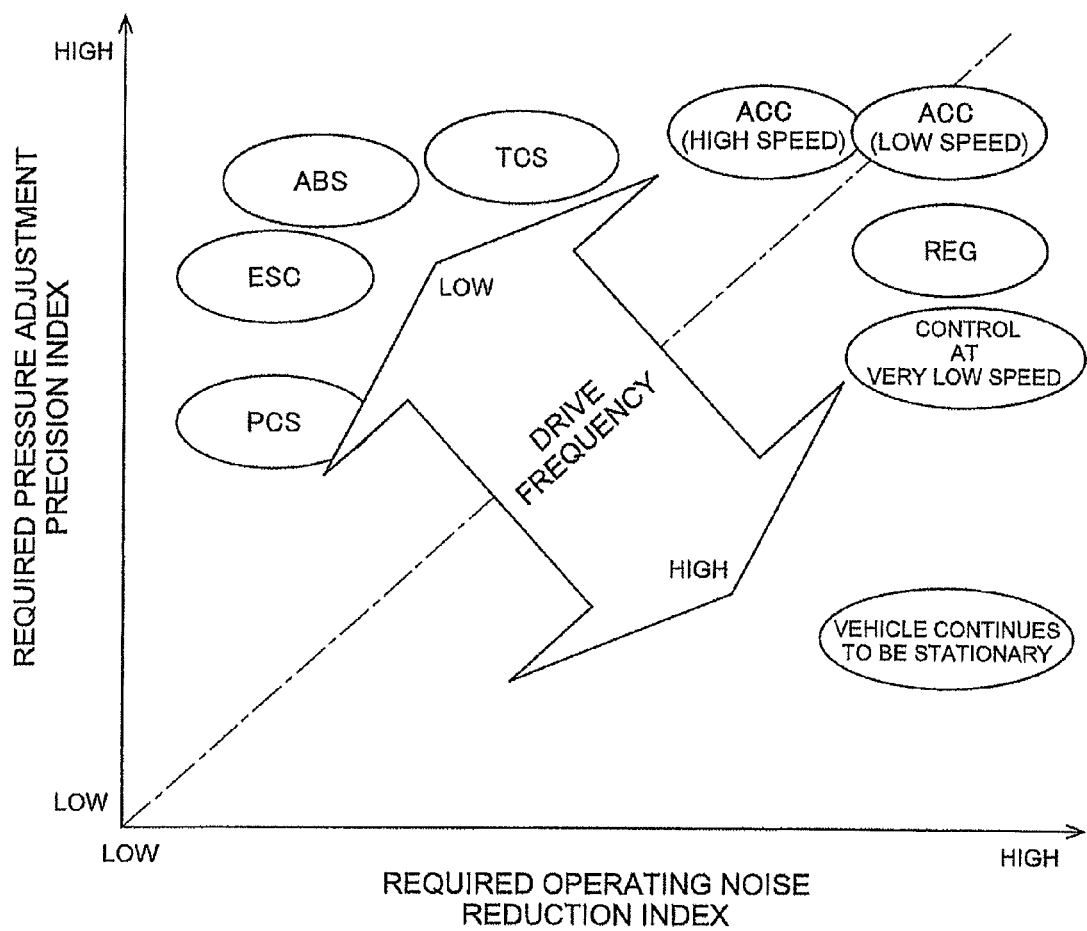
FIG. 6 is a view showing the drive frequency that is set based on the required pressure adjustment precision index and the required operating noise reduction index.

The required pressure adjustment precision index and required operating noise reduction index as described above are specified in advance as being related to each other in the manner shown in FIG. 6. In FIG. 6, the vertical axis indicates the required pressure adjustment precision index, and the horizontal axis indicates the required operating noise reduction index. As shown in FIG. 6, the drive frequency setting section 14 sets the drive frequency of the proportional electromagnetic valve 49 to a higher value the lower the required pressure adjustment precision index is set, or the higher the required operating noise reduction index is set. Specifically, the vehicle occupants are generally relaxed in a state in which the vehicle continues to be stationary, wherein the required pressure adjustment precision is low and the required operating noise reduction index is high. It is therefore preferred in such a control mode that control be performed so that the operating noise caused by the drive frequency is less audible to the vehicle occupants. The drive frequency is therefore set to a high value.

The ABS mode, ESC mode, PCS mode, or TCS mode, in which the required pressure adjustment precision is high, and the required operating noise reduction index is low, is generally used in emergencies, and it is therefore more important that a braking force that corresponds to the status of the vehicle be generated regardless of whether the vehicle occupants are relaxed. In such a control mode, precise control of the pressure adjustment is preferred even when the operating noise caused by the drive frequency is audible to the vehicle occupants. The drive frequency is therefore set to a low value.

Furthermore, the vehicle occupants are generally relaxed in the case of the ACC mode, the REG mode, or a super-low-speed control mode in which the required pressure adjustment precision is high, and the required operating noise reduction index is also high. Precise control of the pressure adjustment is also required. Therefore, in such a control mode or control, a midrange drive frequency is selected that enables a certain degree of pressure adjustment precision and operating noise reduction to be obtained at the same time.

The required operating noise reduction index setting section in this instance sets the required operating noise reduction index to a higher value the lower the speed of the vehicle. Accordingly, the drive frequency setting section 14 sets the drive frequency of the proportional electromagnetic valve 49 to a higher value the lower the speed of the vehicle. Specifically, in the case of the ACC mode shown in FIG. 6, for example, the required operating noise reduction index is set to a higher value in the ACC mode when the vehicle speed is low than in the ACC mode when the vehicle speed is high. The reason for this is that when the vehicle speed is high, the travel noise (engine noise, noise of friction of the tires with the road, and other noise) tends to be greater than when the vehicle speed is low, and when the vehicle speed is low, the operating noise of the proportional electromagnetic valve 49 is easily heard. Therefore, the drive frequency setting section 14 sets the drive frequency to a high value even when the same control mode is in effect when the vehicle speed is low.

The required operating noise reduction index setting section sets the required operating noise reduction index to a higher value the lower the frictional coefficient of the road surface on which the vehicle is positioned. Accordingly, the drive frequency setting section 14 sets the drive frequency of the proportional electromagnetic valve 49 to a higher value the lower the frictional coefficient of the road surface on which the vehicle is positioned. This frictional coefficient is computed from the sensor output transmitted from the G sensor 25. The G sensor 25 thus corresponds to the frictional coefficient acquiring means for acquiring the frictional coefficient of the road surface on which the vehicle is positioned. In the ABS mode shown in FIG. 6, for example, the required operating noise reduction index is set to a higher value the lower the frictional coefficient, and the required operating noise reduction index is set to a lower value the larger the frictional coefficient.

As examples of specific drive frequencies, the drive frequency is preferably set to 7 kHz when the vehicle speed is low, and the drive frequency is preferably set to 3 kHz when the vehicle speed is high. The drive frequency is preferably set to 7 kHz when the frictional coefficient of the road surface on which the vehicle is positioned is small, and the drive frequency is preferably set to 3 kHz when the frictional coefficient of the road surface on which the vehicle is positioned is large. Furthermore, when, for example, the vehicle speed is low, and the road surface on which the vehicle is positioned has a large frictional coefficient, the drive frequency is preferably set to a value that is computed using the average of the drive frequency relating to vehicle speed and the drive frequency relating to frictional coefficient.

The required pressure adjustment precision index setting section and the required operating noise reduction index setting section thus set the required pressure adjustment precision index and required operating noise reduction index on the basis of the braking force control mode determined according to the state of the vehicle. The drive frequency setting section 14 sets the drive frequency of the proportional electromagnetic valve 49 on the basis of the control mode determined by the control mode determining section 11.

Figure 7:
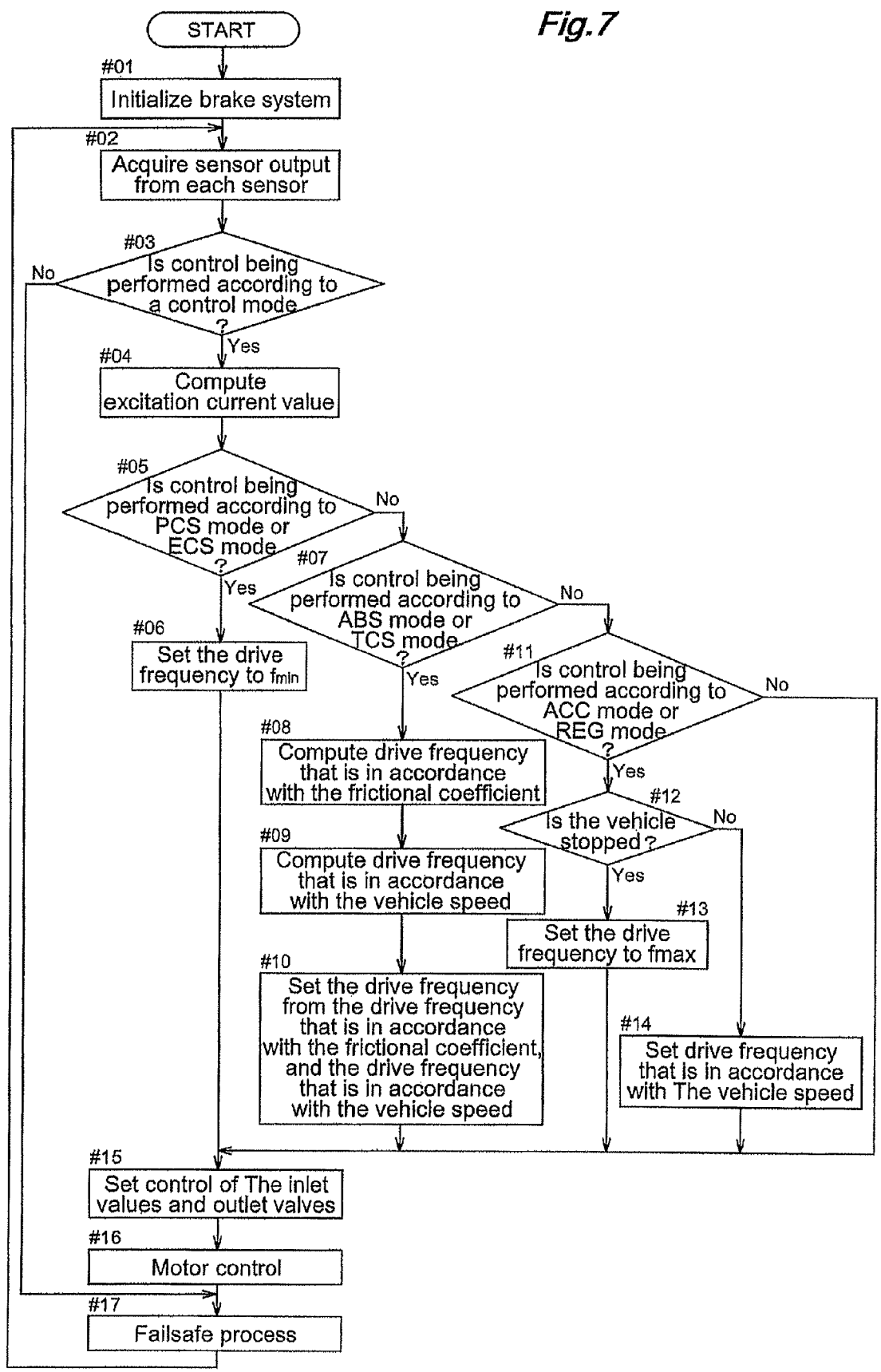
FIG. 7 is a flowchart relating to a process in which the braking control device controls the brake control unit.

The flowchart of FIG. 7 will next be used to describe the process whereby the braking control device 1 controls the brake control unit 40. The brake system 100 first initializes (step #01). This initialization involves initialization of the state of each valve, and initialization of each functional section of the braking control device 1.

The braking control device 1 then acquires sensor outputs from the vehicle wheel speed sensor 21, steering sensor 22, distance sensor 23, yaw rate sensor 24, and G sensor 25 (step #02). When the braking control device 1 is performing control according to any of the control modes (step #03: Yes), the current value computation section 13 computes the excitation current to be applied to the proportional electromagnetic valve 49 (step #04). In step #03, a determination is made that control is being performed according to a control mode when the time that any control mode was determined to be necessary has passed. The determination is made not only on the basis of the state in which control is actually being performed, but also on the basis of a sensor output.

When the control mode currently in effect is the PCS mode or the ESC mode (step #05: Yes), the drive frequency setting section 14 sets the drive frequency to $f_{min}$ (step #06). When the control mode currently in effect is not the PCS mode or the ESC mode (step #05: No), a drive frequency that is in accordance with the frictional coefficient is computed (step #08) when control is being performed according to the ABS mode or the TCS mode (step #07: Yes). A drive frequency that is in accordance with the vehicle speed is also computed (step #09). The drive frequency setting section 14 sets the drive frequency for actually driving the FET 15b from the drive frequency that is in accordance with the frictional coefficient, and the drive frequency that is in accordance with the vehicle speed (step #10).

When the control mode currently in effect is not the ABS mode or the TCS mode (step #07: No), but is the ACC mode or the REG mode (step #11: Yes), verification is made as to whether the vehicle is stopped. When the vehicle is stopped (step #12: Yes), the drive frequency setting section 14 sets the drive frequency to $f_{max}$ (step #13). On the other hand, when the vehicle is not stopped in step #12 (step #12: No), the drive frequency setting section 14 sets the drive frequency to a drive frequency that is in accordance with the vehicle speed (step #14). When a determination is made in step #11 that the control mode currently in effect is not the ACC mode or the REG mode, the process is continued without the drive frequency being set.

When the drive frequency is set by the drive frequency setting section 14 in step #06, step #10, step #13, and step #14 as described above, or when the drive frequency is not set in step #11 (step #11: No), the braking control device 1 sets the opening and closing state of the inlet valves 42 and outlet valves 44 (step #15).

The electric motor M is then controlled (step #16), the pump P is driven, and a failsafe process relating to the control mode is executed (step #17). The process then returns to step #02 and is continued. In step #03, when control is not being performed according to a control mode (step #03: No), a failsafe process is executed as needed (step #17). The braking control device 1 thus controls the brake system 100 while reducing the operating noise that occurs due to the drive frequency of the proportional electromagnetic valve 49, without reducing the performance of fluid pressure control.

Other Embodiments

In the embodiment described above, a one motor/two pump type, in which two pumps P are operated by one electric motor M, is shown in FIG. 5 as an example of the internal structure of the brake control unit 40 controlled by the braking control device 1. However, the present invention is not limited by this configuration. For example, even in the case of a two-motor/four-pump brake control unit in which four pumps P are operated by two electric motors M, the braking control device 1 of the present invention makes it possible for controllability and operating noise reduction of the proportional electromagnetic valve 49 to be obtained at the same time by setting the drive frequency of the proportional electromagnetic valve 49 according to a braking force control mode that is determined by the state of the vehicle.

In the embodiment described above, the braking control device 1 of the present invention is described as being configured so that the drive frequency setting section 14 sets the drive frequency of the proportional electromagnetic valve 49 on the basis of a required pressure adjustment precision index that is set based on the pressure adjustment precision required when the fluid pressure is adjusted according to the required braking force, and on the basis of a required operating noise reduction index that is set based on a requirement to reduce the operating noise caused by the drive frequency for driving the proportional electromagnetic valve. However, the present invention is not limited by this configuration. It is apparent that a configuration may be adopted whereby the control mode determining section 11 determines a braking force control mode according to the state of the vehicle, and, based on the control mode determined by the control mode determining section 11, the drive frequency setting section 14 sets the drive frequency of the proportional electromagnetic valve 49 to a higher value the lower the speed of the vehicle as acquired by the vehicle wheel speed sensor 21 as a vehicle speed acquiring means. Specifically, a configuration may be adopted in which the drive frequency of the proportional electromagnetic valve 49 is set to a low value when the vehicle speed is high, and the drive frequency of the proportional electromagnetic valve 49 is set to a high value when the vehicle speed is low during control of the control mode (e.g., the ABS mode). Through this configuration, the operating noise caused by the drive frequency of the proportional electromagnetic valve 49 can be made less noticeable even when the vehicle speed is low, and there is minimal travel noise.

A configuration may also be adopted in which the drive frequency setting section 14 sets the drive frequency of the proportional electromagnetic valve 49 to a higher value the smaller the frictional coefficient of the road surface on which the vehicle is positioned, as acquired by the G sensor 25 as the frictional coefficient acquiring means. Through this configuration, when the frictional coefficient of the road surface is small and the vehicle occupant is driving with caution, the drive frequency of the proportional electromagnetic valve is set to a high value, and the operating noise caused by the drive frequency of the proportional electromagnetic valve can therefore be made inaudible to the vehicle occupant.

In the embodiment described above, the required pressure adjustment precision index and the required operating noise reduction index are specified in advance as being related to each other in the manner shown in FIG. 6. A configuration may be adopted in which the required pressure adjustment precision index and the required operating noise reduction index are amended according to the type of vehicle in which the braking control device 1 of the present invention is mounted. Adopting such a configuration makes it possible for the braking control device 1 of the present invention to be utilized in various types of vehicles according to corrections made to the required pressure adjustment precision index and the required operating noise reduction index.

In the embodiment described above, the drive frequency of the proportional electromagnetic valve 49 is described as being set on the basis of the required pressure adjustment precision index and the required operating noise reduction index. However, the present invention is not limited by this configuration. For example, it is apparent that a configuration may be adopted in which the drive frequency is amended in conjunction with a resonance frequency of the proportional electromagnetic valve 49. Adopting such a configuration makes it possible to more effectively reduce the operating noise in accordance with the structure of the proportional electromagnetic valve 49.

What is claimed is:

1. A braking control device for adjusting a fluid pressure according to the degree of opening of a proportional electromagnetic valve driven at a set drive frequency, and controlling a braking force on the basis of the adjusted fluid pressure, said braking control device comprising:
    required pressure adjustment precision index setting means for setting a required pressure adjustment precision index on the basis of the precision of pressure adjustment required when the fluid pressure is adjusted according to a required braking force;
    required operating noise reduction index setting means for setting a required operating noise reduction index on the basis of a requirement to reduce operating noise caused by said drive frequency for driving said proportional electromagnetic valve; and
    drive frequency setting means for setting the drive frequency of said proportional electromagnetic valve on the basis of said set required pressure adjustment precision index and required operating noise reduction index.

2. The braking control device according to claim 1, wherein said drive frequency setting means sets the drive frequency of said proportional electromagnetic valve to a value that increases with decreased said set required pressure adjustment precision index, or increased said set required operating noise reduction index.

3. The braking control device according to claim 1, wherein said required operating noise reduction index setting means sets said required operating noise reduction index to a value that increases with decreased vehicle speed.

4. The braking control device according to claim 1, comprising frictional coefficient acquiring means for acquiring the frictional coefficient of a road surface on which the vehicle is positioned; wherein
    said required operating noise reduction index setting means sets said required operating noise reduction index to a value that increases with decreased said acquired frictional coefficient of the road surface.

5. The braking control device according to claim 1, comprising control mode determining means for determining a control mode of said braking force according to the state of the vehicle; wherein
    said required pressure adjustment precision index setting means and said required operating noise reduction index setting means set said required pressure adjustment precision index and required operating noise reduction index on the basis of said determined control mode of said braking force.

6. The braking control device according to claim 2, wherein said required operating noise reduction index setting means sets said required operating noise reduction index to a value that increases with decreased vehicle speed.

7. The braking control device according to claim 6, comprising frictional coefficient acquiring means for acquiring the frictional coefficient of a road surface on which the vehicle is positioned; wherein
    said required operating noise reduction index setting means sets said required operating noise reduction index to a value that increases with decreased said acquired frictional coefficient of the road surface.

8. The braking control device according to claim 7, comprising control mode determining means for determining a control mode of said braking force according to the state of the vehicle; wherein
    said required pressure adjustment precision index setting means and said required operating noise reduction index setting means set said required pressure adjustment precision index and required operating noise reduction index on the basis of said determined control mode of said braking force.

9. The braking control device according to claim 2, comprising frictional coefficient acquiring means for acquiring the frictional coefficient of a road surface on which the vehicle is positioned; wherein
    said required operating noise reduction index setting means sets said required operating noise reduction index to a value that increases with decreased said acquired frictional coefficient of the road surface.

10. The braking control device according to claim 9, comprising control mode determining means for determining a control mode of said braking force according to the state of the vehicle; wherein
said required pressure adjustment precision index setting means and said required operating noise reduction index setting means set said required pressure adjustment precision index and required operating noise reduction index on the basis of said determined control mode of said braking force.

11. The braking control device according to claim 2, comprising control mode determining means for determining a control mode of said braking force according to the state of the vehicle; wherein
said required pressure adjustment precision index setting means and said required operating noise reduction index setting means set said required pressure adjustment precision index and required operating noise reduction index on the basis of said determined control mode of said braking force.

12. The braking control device according to claim 3, comprising frictional coefficient acquiring means for acquiring the frictional coefficient of a road surface on which the vehicle is positioned; wherein
said required operating noise reduction index setting means sets said required operating noise reduction index to a value that increases with decreased said acquired frictional coefficient of the road surface.

13. The braking control device according to claim 12, comprising control mode determining means for determining a control mode of said braking force according to the state of the vehicle; wherein
said required pressure adjustment precision index setting means and said required operating noise reduction index setting means set said required pressure adjustment precision index and required operating noise reduction index on the basis of said determined control mode of said braking force.

14. The braking control device according to claim 3, comprising control mode determining means for determining a control mode of said braking force according to the state of the vehicle; wherein
said required pressure adjustment precision index setting means and said required operating noise reduction index setting means set said required pressure adjustment precision index and required operating noise reduction index on the basis of said determined control mode of said braking force.

15. The braking control device according to claim 4, comprising control mode determining means for determining a control mode of said braking force according to the state of the vehicle; wherein
said required pressure adjustment precision index setting means and said required operating noise reduction index setting means set said required pressure adjustment precision index and required operating noise reduction index on the basis of said determined control mode of said braking force.

16. A braking control device for adjusting a fluid pressure according to the degree of opening of a proportional electromagnetic valve driven at a set drive frequency, and controlling a braking force on the basis of the adjusted fluid pressure; said braking control device comprising:
vehicle speed acquiring means for acquiring the speed of the vehicle; and
drive frequency setting means for setting the drive frequency of said proportional electromagnetic valve to a value that increases with decreased said acquired vehicle speed.

17. A braking control device for adjusting a fluid pressure according to the degree of opening of a proportional electromagnetic valve driven at a set drive frequency, and controlling a braking force on the basis of the adjusted fluid pressure; said braking control device comprising:
frictional coefficient acquiring means for acquiring the frictional coefficient of a road surface on which the vehicle is positioned; and
drive frequency setting means for setting the drive frequency of said proportional electromagnetic valve to a value that increases with decreased said acquired frictional coefficient of the road surface.

* * * * *